(12) United States Patent
Ferguson et al.

(10) Patent No.: US 11,086,903 B2
(45) Date of Patent: Aug. 10, 2021

(54) METHODS AND SYSTEM FOR OPTIMAL MULTI-ENVIRONMENT DATA SYNCHRONIZATION/REPLICATION

(71) Applicant: Teradata US, Inc., Englewood, OH (US)

(72) Inventors: Gregory Paul Ferguson, Oakville (CA); David Tung, Toronto (CA); Stanley S Chiu, La Mirada, CA (US); Donald Raymond Pederson, San Diego, CA (US)

(73) Assignee: Teradata US, Inc., San Diego, CA (US)

(*) Notice: Subject to any disclaimer, the term of this patent is extended or adjusted under 35 U.S.C. 154(b) by 245 days.

(21) Appl. No.: 16/456,156

(22) Filed: Jun. 28, 2019

(65) Prior Publication Data

US 2020/0004758 A1    Jan. 2, 2020

Related U.S. Application Data

(60) Provisional application No. 62/691,294, filed on Jun. 28, 2018.

(51) Int. Cl.
*G06F 9/54* (2006.01)
*G06F 16/27* (2019.01)
*G06F 9/52* (2006.01)
*G06F 16/242* (2019.01)

(52) U.S. Cl.
CPC .............. *G06F 16/275* (2019.01); *G06F 9/52* (2013.01); *G06F 9/542* (2013.01); *G06F 16/2433* (2019.01)

(58) Field of Classification Search
CPC ...... G06F 9/54; G06F 9/546; G06F 17/30286; G06F 17/30575; G06F 17/30578; G06F 17/30864; H04L 29/0854
USPC ......... 707/609, 610, 612, 613, 705; 719/313
See application file for complete search history.

(56) References Cited

U.S. PATENT DOCUMENTS

| 6,178,418 | B1 | 1/2001 | Singer | |
|---|---|---|---|---|
| 8,037,022 | B2* | 10/2011 | Rahman | ................. G06F 16/40 707/613 |
| 8,209,696 | B2 | 6/2012 | Ferguson et al. | |
| 8,209,699 | B2 | 6/2012 | Ferguson et al. | |

(Continued)

*Primary Examiner* — Andy Ho
(74) *Attorney, Agent, or Firm* — Schwegman, Lundberg & Woessner P.A.

(57) ABSTRACT

A data-changing request is received on a first data source system. Metadata for a data source object associated with the request is obtained. The request is executed on a second data source system and results are obtained. A selection between multiple replication processes is made based on the metadata and the results. The selected process is performed on each of the remaining data source systems to synchronize/replicate data changes on the remaining data source systems. In an embodiment, bidirectional and concurrent data connections are permitted to a source object for one data source system and a replicated version of the source object on a different source system. In an embodiment, each data source system includes an agent that establishes an out-of-band connection to a synchronization/replication server, such that synchronization/replication is processed by the server without an affirmative connection being made from the data source systems to the server.

21 Claims, 4 Drawing Sheets

(56) References Cited

U.S. PATENT DOCUMENTS

| | | |
|---|---|---|
| 8,627,330 B2 | 1/2014 | Mehta et al. |
| 9,612,921 B2 | 4/2017 | Ferguson |
| 10,133,797 B1 | 11/2018 | Mishra |
| 10,503,699 B2 * | 12/2019 | Gupta .................. G06F 16/182 |
| 2017/0132296 A1 | 5/2017 | Ding |
| 2017/0169071 A1 | 6/2017 | Petri et al. |

* cited by examiner

METHODS AND SYSTEM FOR OPTIMAL MULTI-ENVIRONMENT DATA SYNCHRONIZATION/REPLICATION

RELATED APPLICATIONS

The present application claims priority to and is a non-provisional of U.S. Provisional Application No. 62/691,294 filed on Jun. 28, 2018 and entitled: "Unity Change Data Multicast (CDM) Database Synchronization System and Method," the disclosure of which is incorporated by reference herein in its entirety.

BACKGROUND

Increasingly, organizations are relying on data collected and stored to plan, run, and direct their affairs. The data represents information which is the lifeblood of the organization itself. When the data is unavailable, the organization can suffer severe adverse consequences. Consequently, significant human resources and capital are invested in maintaining data and ensuring that the data is available twenty-four hours a day and three-hundred sixty-five days a year.

Still further, the response times associated with obtaining needed information from an organization's data must be timely, which means that for large data stores (data stores distributed across multiple environments), each environment must be efficiently load-balanced to not overtax any given environment and to ensure that each environment's resources are optimally utilized.

Many distributed load-balancing and synchronization products are available in the industry. However, these products have many significant shortcomings. As an example, these products require a user to have an affirmative connection to the products, such: is not convenient, may be associated with interfaces that are foreign to the user, and is often forgotten by the user (particularly with users who unfamiliar with the product).

Also, for large distributed database environments there may be more than one mechanism by which data can be replicated (each mechanism having its own benefits and drawbacks unique to that mechanism). None of the existing products provide an automatic selection of an optimal mechanism for use in any given situation; rather, with these products the user must decide which mechanism to use in advance of any executed data change operation; or, these products only provide a single predetermined and fixed mechanism by which the data can be replicated.

Furthermore, existing products prohibit bidirectional data-changing connections, which means a user connected to a first data environment and making a change to a data source actively prevents a second user from simultaneously also making a connection to the same database table (which is replicated) in a second data environment for purposes of making additional changes.

SUMMARY

In various embodiments, methods and a system for optimal multi-environment data synchronization/replication are provided.

In one aspect provided herein, a method for optimal multi-environment data synchronization/replication is provided. A data-changing request is received from a first data system. A source data system is identified based on the data-changing request. The data-changing request is provided to the source data system for processing. A synchronization process is selected from multiple synchronization processes based on the data-changing request and the status information. Target data systems are instructed to process the synchronization process to ensure data changes made to data source objects by the source data system when processing the data-changing request are synchronized and replicated on the target data systems using the synchronization process.

DETAILED DESCRIPTION

Figure 1:
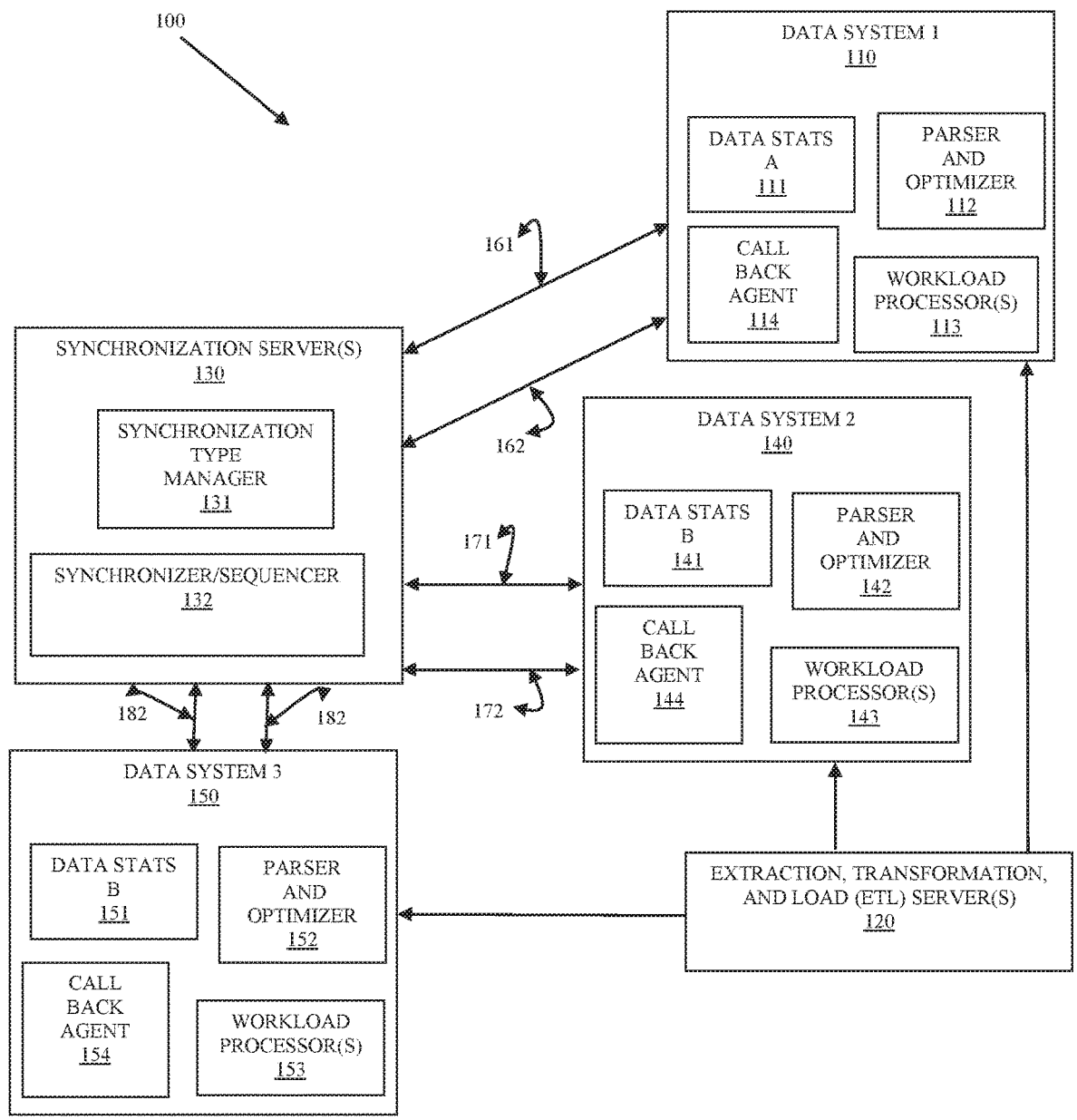
FIG. 1 is a diagram of a system for optimal multi-environment data synchronization/replication, according to an embodiment.

FIG. 1 is a diagram of a system 100 for optimal multi-environment data synchronization/replication, according to an embodiment. The system 100 is shown in greatly simplified form with just those components necessary for understanding the teachings of optimal multi-environment data synchronization/replication being illustrated. It is to be noted that a variety of other components or less components can be employed without departing from the teachings of optimal multi-environment data synchronization/replication presented herein and below.

The system 100 includes: a first data source system 110, an Extraction, Transformation, and Load (ETL) server 120, a synchronization server 130, a second data system 140, and a third data system 150. The first data system 110 includes: local data statistics/logs 111, a parser/optimizer 112, one or more workload processors 113, and a synchronization (call back agent) 114. The second data source environment 140 includes: a local data statistics/logs 141, a parser and optimizer 142, one or more workload processors 143, and a call back agent 144. Similarly, the third data system 150 includes: a local data statistics/logs 151, a parser and optimizer 152, one or more workload processors 153, and a call back agent 154. The synchronization server 130 includes a synchronization (sync) type manager 131 and a synchronizer/sequencer 132.

Additionally, the synchronization server establishes, as needed, both in-band connections (161, 171, and 181) to each of the database systems (110, 140, and 150) and out-of-band (OOB) connections (162, 172, and 182) to communicate with each of the database systems (110, 140, and 150).

An in-band connection is a normal connection between the Application Programming Interfaces (APIs) between the databases (110, 140, and 150) and the synchronization server 130. Whereas the OOB connections (162, 172, and 182) are specialized connections allowing novel message passing and outside of a normal in-band connection, such allows for alerting and engaging the synchronization server 130 even when there is no existing pre-established in-band connection from a source database system (110, 140, or 150), such also allows the synchronization server 130 to obtain novel metadata useful for the database systems (110, 140, and 150) for purposes of deciding whether to pursue a specific synchronization process when synchronization is needed.

As used herein, the terms and phrases "database," "DBMS," "data store," and "data warehouse" may be used interchangeably and synonymously. That is, a data warehouse may be viewed as a collection of databases or a collection of data from diverse and different data source systems that provides a centralized access and federated view of the data from the different data source systems/environments (110, 140, and 150) through the data warehouse (may be referred to as just "warehouse"). The DBMS includes a variety of database tools/interfaces and operations to manage and provide database services. So, each data source system/environment (110, 140, and 150) cooperates to logically represent a single data warehouse that includes distributed and replicated data over one or more network connections utilizing the tools/interfaces and operations.

It is also to be noted that although the ETL server 120 and the synchronization server 130 are represented as a single server in the FIG. 1, this was done for illustration and each 120 and 130 may comprise a plurality of cooperating servers. Similarly, although each data source system/environment (110, 140, and 150) is represented by a single box in the FIG. 1, this too was done for illustration and each may comprise a plurality of cooperating servers.

The synchronizer/sequencer 132 (may be referred to herein as either synchronizer 132 or sequencer 132) performs data database virtualization, sequencing, and load balancing for purposes of multi-environment data synchronization/replication in the manners described U.S. Pat. Nos. 8,209,696; 8,209,699; and 9,612,921; the disclosures of which are incorporated by reference herein in their entireties.

Currently, the primary technique, by which data is synchronized or replicated, is an approach that broadcasts Structured Query Language (SQL) queries/commands to multiple databases (referred to as "SQL multicast").

However, even when these queries/commands are properly sequenced (as is done in the above-referenced Patent Nos.), there are some limitations as follows: (1) Queries that involve server-side functionality that are non-deterministic (the same query executed twice with the same source data would produce different results) such as identity keys, statistical sampling, updates that use randomly ordered data sets (cursor updates), or execution of server-side programs that contain arbitrary code (e.g. stored procedures), cannot be executed in a way that guarantees data consistency in all cases using SQL multicast. Moreover, disallowing access to the database features that uses these non-deterministic query elements prevents data inconsistency, but is not acceptable to many customers, as modifying existing workloads is either costly or impractical (e.g. use of third-party tools outside customer control). (2) Input data (for example the source tables in an insert-select) used to process a transaction is required to be available and in sync on all target systems. This can be a problem in heterogeneous environments. (3) For systems to be kept in sync, access to the managed database systems must be via connections to the underlying synchronization service/application. This requires modifications to customer environments that can be laborious and, if not done correctly, can result in data synchronization failures.

Rather than foreclose synchronization/replication in cases where SQL multicast is unavailable (such as in (1)) or where SQL multicast is difficult to achieve (such as in (2) and (3)), a second synchronization/replication technique is proposed referred to herein as Change Data Multicast (CDM).

The sync type manager 131 decides based on a submitted query/workload from one of the data source system/environments (110, 140, and 150) whether it is optimal or not to achieve the data change synchronization/replication utilizing SQL multicast or CDM multicast. The synchronizer/sequencer 132 then processes the SQL multicast or the CDM multicast based on the determination made by the sync type manager 131.

The synchronizer/sequencer 132, when processing, CDM multicasting, sends the query/workload commands to one of the managed data source systems/environments (110, 140, or 150) and captures are the resulting data changes that were produced by that data source environment (110, 140, or 150). The data changes are then multicast to all other participating data source systems/environments (110, 140, and/or 150). So, rather than all the participating data source systems/environments being required to each execute the query/workload commands only one data source system/environment executes the query/workload commands and the resulting changes are copied to the other participating data source systems/environments.

Furthermore, unlike conventional synchronization/replication approaches, each data source system/environment (110, 140, or 150) does not require an affirmative and pre-establish in-band connection to the synchronization server 130; rather, a call back agent (114, 144, or 154) provides a message passing mechanism between data source system/environments (110, 140, and 150) and the sync type manager 131. This means that there is no need to force a user to establish an in-band connection to the server 130. The call back agents (114, 144, and 154) ensure that if a data change is needed with a synchronized target data source, then that synchronization will be processed (decisions on synchronization/replication made by manager 131 and performed by synchronizer/sequencer 132 based on metadata and data stats (111, 141, and 151) provided in the messages). This also means that bidirectional connections to a same data source are possible where one replicated data source can have two simultaneous data changing connections, because the messaging passing ensures that proper locks are established as needed on the replicated data source in all environments (110, 140, and 150) by manager 131 and/or synchronizer/sequencer 132; such was not possible with existing synchronization/replication approaches.

CDM also suffers drawbacks that are considered by manager 131 when determining whether synchronizer/sequencer 132 is to perform SQL multicast or CDM, such drawbacks are as follows: (1) Collecting and transmitting change data to an intermediary or target system imposes a large resource burden on the source database. This overhead is often unacceptable to customers. (2) For transactions that can be applied using SQL multi-cast, SQL multi-cast is generally (although not always) the most efficient method of application as transactions are applied using the smallest amount of Input/Output (I/O) on the managed systems, and the least amount of resources on the servers. (3) Transactions that modify large amounts of data using set operations are inefficiently applied on the target as CDM does not use set operations and in the worst case is applied in a serial, row at a time fashion. (4) CDM typically cannot allow for synchronization of database elements other than simple data. For example, Data Definition Language (DDL), users, access rights, etc. This significantly impedes the process of fail-over and fail-back in a High-Availability (HA) system and is a burden on the database administrator.

During operation of system 100, an Out-Of-Band (OOB) set of connections are established between synchronization server 130 and the data warehouse (data source systems/environments 110, 140, and 150), The OOB connections include: commands, metadata, and data messages sent between server 130 and the data warehouse (systems 110, 140, and 150). This OOB interface is used to coordinate execution of fine-grained execution of requests at the database (data warehouse), with steps executing under server 130 control, and with metadata and data feedback from the database to allow for SQL or change-data collection for each step as needed. Agents 114, 144, and 154 provide the source systems/environments (110, 140, and 150) OOB connections to server 130.

As used herein, a "transaction" is: a query, a workload, a portion of a workload, or a set of database commands that are being initiated on one of the multiple source systems/environments (110, 140, and 150). Moreover, a "transaction" may be used synonymously and interchangeably herein with the term "request."

The transaction is evaluated by parser/optimizer (112, 142, and 152) based on the source system (110, 140, or 150) that is initiate the transaction/request. Output from the source parser/optimizer (112, 142, or 152) is provided along with dictionary content for the specific data sources being used with the transaction/request, and user configuration information. Based on this data (provided by source agent (114, 144, or 154) to manager 131), the manager 131 decides as to whether it is possible that CDM may be a better option or a needed option for the transaction/request.

Assuming CDM is required, manager 1331 selects a source system (110, 140, or 150) for execution of the request. Synchronizer/Sequencer 132 sends the transaction to that source system (110, 140, or 150) for execution. Metadata from the OOB interface (through agents 114, 144, and 154) is returned. The metadata includes session context required for the transaction/request (e.g., query) execution, on data source object locking details (e.g., database, table, row hash locks, and other lock data). The state of objects (e.g., tables) needed for execution are checked. If no objects are configured to be synchronized across systems (110, 140, and 150), the synchronization/replication request is ignored and the selected source system (110, 140, or 150) executes the transaction/request and processing stops there is no need for any synchronization/replication. If not all of the objects needed for the transaction are active (or are read-only for objects that are only being read and not changed), the transaction/request is aborted, and processing stops.

Assuming neither of the last two referenced conditions are detected, the metadata is used to acquire locks from the participating systems (110, 140, and 150) using synchronizer/sequencer 132, If not all of the locks can be granted (e.g. deadlock), abort the transaction/request and processing stops. If all needed locks are obtained, wait for matching locks to be granted from a dispatcher of the source system (110, 140, or 150—the system that is to execute the request). Manager 131 then selects either SQL multicast or CDM for executing the request/transaction and manager 131 informs the data warehouse on the OOB channel. If CDM is selected, collect and store changed data from the executing or source system (110, 140, or 150) prior to committing the changed data to the database. After the transaction completes, retrieve request status (activity types and counts) and store. Write the SQL multicast or CDM operations performed with the transaction in a recover log, tagged with object locks and sequence numbers assigned by the synchronizer/sequencer 132, and session context metadata. Next, those operations are queued at dispatchers for the target systems (110, 140, or 150). The target system (110, 140, or 150) is the system that needs to have the changed data updated to its data sources based on execution of the request on the selected source system (110, 140, or 150). On a given target system (110, 140, or 150) execute the transaction (SQL or changed data that is being copied with CDM) once locks for that system (110, 140, and 150) are granted. Validate that the transaction status of the target system (110, 140, or 150) matches the original executing source system (110, 140, or 150). If there is not a match, mark objects on the target system as unrecoverable, interrupted, or read-only depending upon the nature of the status mismatch.

The entire process is repeated for every sub-request where sub-requests can occur (for example with stored procedures).

As an example, suppose a query is issued from system 110. The parser/optimizer 112 determines the source data objects needed for executing the query and the appropriate data statistics 111 associated therewith. Call back agent 114, through an OOB connection, sends output from the parser 112 and other metadata about the user and the query to manager 131. Manager 131 decides if CDM is needed or if it is even a possible option based on the metadata and selects system 140 to execute the query. Results and stats from executing the query are returned to synchronizer/sequencer 132. If SQL multicast is used, the synchronizer/sequencer 132 acquires the necessary locks for the source objects and sends the query for execution to system 110 and 150 for replicating the results; if CDM is used locks are obtained for the source objects and the results are copied to systems 110 and 150.

The system 100 permits synchronization/replication in a distributed and mufti-database system environment (e.g., data warehouse) by selecting from two or more synchronization/replication processing techniques (e.g., SQL multicast and CDM) for changed data processed with a request on an initial database system. Selection is based on what is optimal for the request (based on the underlying data affected by processing the request). Current synchronization techniques do not provide for this automated selection of multiple change data synchronization/replication techniques.

Moreover, the system 100 permits bidirectional connections to a same data source that is replicated on different data systems (110, 140, and 150). So, a user can connect to change a table T on system 110 while at the same time a different user connects to a replicated table T on system 150; such was not possible with previous synchronization techniques.

Still further, the system 100 permits direct system connections without a need to affirmatively connect to the synchronization server 130; again, such was not the case with previous synchronization techniques.

The bidirectional and no-affirmative synchronization service connection approaches are possible because of the OOB connections that are transparent to the users on each of the systems (110, 140, and 150) and is achieved through the call back agents (114, 144, and 154). The OOB connections are processed through message passing between the systems (110, 140, and 150) and the synchronization server 130.

These and other embodiments will now be discussed with reference to the FIGS. 2-4.

Figure 2:
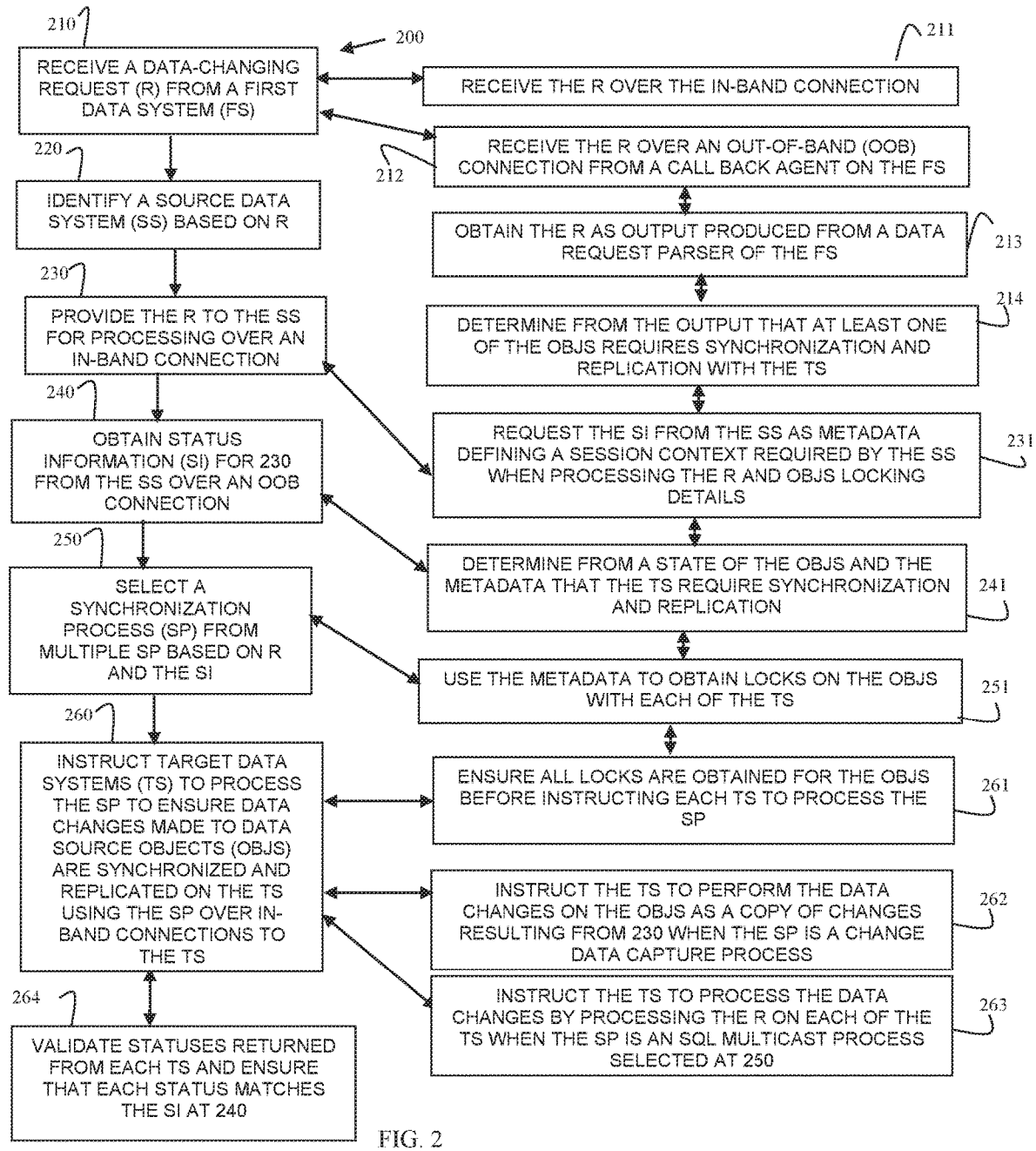
FIG. 2 is a diagram of a method for optimal multi-environment data synchronization/replication, according to an example embodiment.

FIG. 2 is a diagram of a method 200 for optimal multi-environment data synchronization/replication, according to an example embodiment. The method 200 is implemented as one or more software modules referred to as a "synchronization-and-replication controller"). The synchronization-and-replication controller represents executable instructions that are programmed within memory or a non-transitory computer-readable medium and executed by one or more hardware processors of one or more devices. The synchronization-and-replication controller may have access to one or more network connections during processing, which can be wired, wireless, or a combination of wired and wireless.

In an embodiment, the synchronization-and-replication controller executes on server 130.

In an embodiment, the synchronization-and-replication controller executes on multiple servers as different cooperating instances that logically operated as a single synchronization-and-replication controller.

In an embodiment, the synchronization-and-replication controller is the synchronization type manager 131 and/or the synchronization/sequencer 132.

At 210, the synchronization-and-replication controller receives a data-changing request from a first data system. In an embodiment, the first data system is a database that includes a data object/resource that is synchronized or replicated in other databases, representing a multi-environment synchronization on the data object/resource. In an embodiment, the data object is a database table, a row of a table, column of a table, a database, a view, a stored procedure, permissions, user-defined object, and other types of data objects.

In an embodiment, at 211, the synchronization-and-replication controller receives the data-changing request over the in-band connection from the first data system. That is, the first data system is connected direction to the synchronization-and-replication controller and over that connection the data-changing request is received.

In an embodiment, at 212, the synchronization-and-replication controller receives the data-changing request over an OOB connection from a call back agent on the first data system. In an embodiment, the call back agent is one of the call back agents 114, 144, or 154.

In an embodiment, the request is received from the first data system when the first data system lacks an affirmatively established connection to the synchronization-and-replication controller. This is done through message passing and messages received from the call back agent of 211.

In an embodiment of 212 and at 213, the synchronization-and-replication controller obtains the data-changing request as output that is produced from a data request parser of the first data system. In an embodiment, the data request parser is a database query parser. In an embodiment, the data request parser is one of the parsers 112, 142, or 152.

In an embodiment of 213 and at 214, the synchronization-and-replication controller determines, from the output, that data source objects are modified by the first data system when executing the data-changing request, and those data source objects require synchronization and replication with one or more target data systems.

At 220, the synchronization-and-replication controller identifies a source data system based on the data-changing request. That is, one data system includes data source objects that are to be synchronized and replicated and those data source objects will be modified by the first data system when executing the data-changing request.

At 230, the synchronization-and-replication controller provides the data-changing request to the source data system for processing. That is, the source data system executes the same data-changing request as what was submitted on the first data system. The first data system when authorized to execute the data-changing request becomes the source data system. The data-changing request is provided over an in-band connection between the synchronization-and-replication controller and the source database system (first data system). In an embodiment, the data-changing request is an SQL query.

In an embodiment of 214 and 230, at 231, the synchronization-and-replication controller requests status information from the source data system as metadata defining a session context requires by the source data system when processing the request and data source object locking details that were needed by the source data system when processing the request.

At 240, the synchronization-and-replication controller obtains the status information from the source data system after the source data system processes the request at 230 over an OOB connection between the synchronization-and-replication controller and the source database system.

In an embodiment of 231 and 240, at 241, the synchronization-and-replication controller determines from a state of the source data objects and the metadata that the target data systems require synchronization and replication on the source data objects because such target data systems include replications of the source data objects within their environments and the second data system made changes to those source data objects.

At 250, the synchronization-and-replication controller selects a synchronization process from multiple synchronization processes based on the original data-changing request and the status/results information returned from the second data system that also processed the data-changing request.

This selection is based on rules that evaluate the status/results and details of the request in view of the benefits and drawbacks as discussed above for SQL multicast or CDM. For example, non-deterministic queries cannot rely on SQL multicast. So, any random variable used for a non-deterministic query has to be made consistent to achieve a same result that was produced on the first and source data systems. Other considerations are made as well, all of which were discussed on Provisional 62/691,294; the disclosure of which was and is again incorporated by reference herein in its entirety.

In an embodiment of 241 and 250, at 251, the synchronization-and-replication controller uses the metadata and obtains locks on the source objects with each of the target data systems that require updates on the source objects.

At 260, the synchronization-and-replication controller instructs each of the target data systems to process the selected synchronization process to ensure data changes made to the data source objects are synchronized and replicated on the target data systems using the selected synchronization process. This instruction is processed over in-band connections between the synchronization-and-replication controller and the target data systems.

In an embodiment of 251 and 260, at 261, the synchronization-and-replication controller ensures all locks are obtained for the source data objects before instructing each target data system to process the selected synchronization process. It is noted that the manner that this is achieved can be done through dispatchers and processing queues as was discussed in the U.S. Pat. Nos. 8,209,696; 8,209,699; and 9,612,921; the disclosures of which were and are again incorporated by reference herein in their entireties.

In an embodiment of 260, at 262, the synchronization-and-replication controller instructs the target data system to perform the data changes on the source data objects as a copy of changes resulting from the source data system at 230 processing the data-changing request. This is done when the synchronization process is a Change Data Capture process or a CDM as discussed above with the FIG. 1. So, the actual data-changing request is not processed on the target data systems in this embodiment; rather the data changes made by the source data system when processing the data-changing request are provided by the synchronization-and-replication controller to the target data systems and the target data systems copy the changes over to the source data objects.

In an embodiment of 260, at 263, the synchronization-and-replication controller instructs the target data systems to process the data changes by processing the data-changing request on each of the target data systems. This occurs when the selected synchronization process is an SQL multicast, which was selected at 250.

In an embodiment of 260, at 264, the synchronization-and-replication controller validates statuses returned from each of the target data systems and ensures that each status matches the status information provided by the source data system at 240. If any of the target data systems report a different status, then the data source objects on those target data systems are flagged as being unrecoverable, interrupted, or read-only depending on the nature of the status mismatch.

Figure 3:
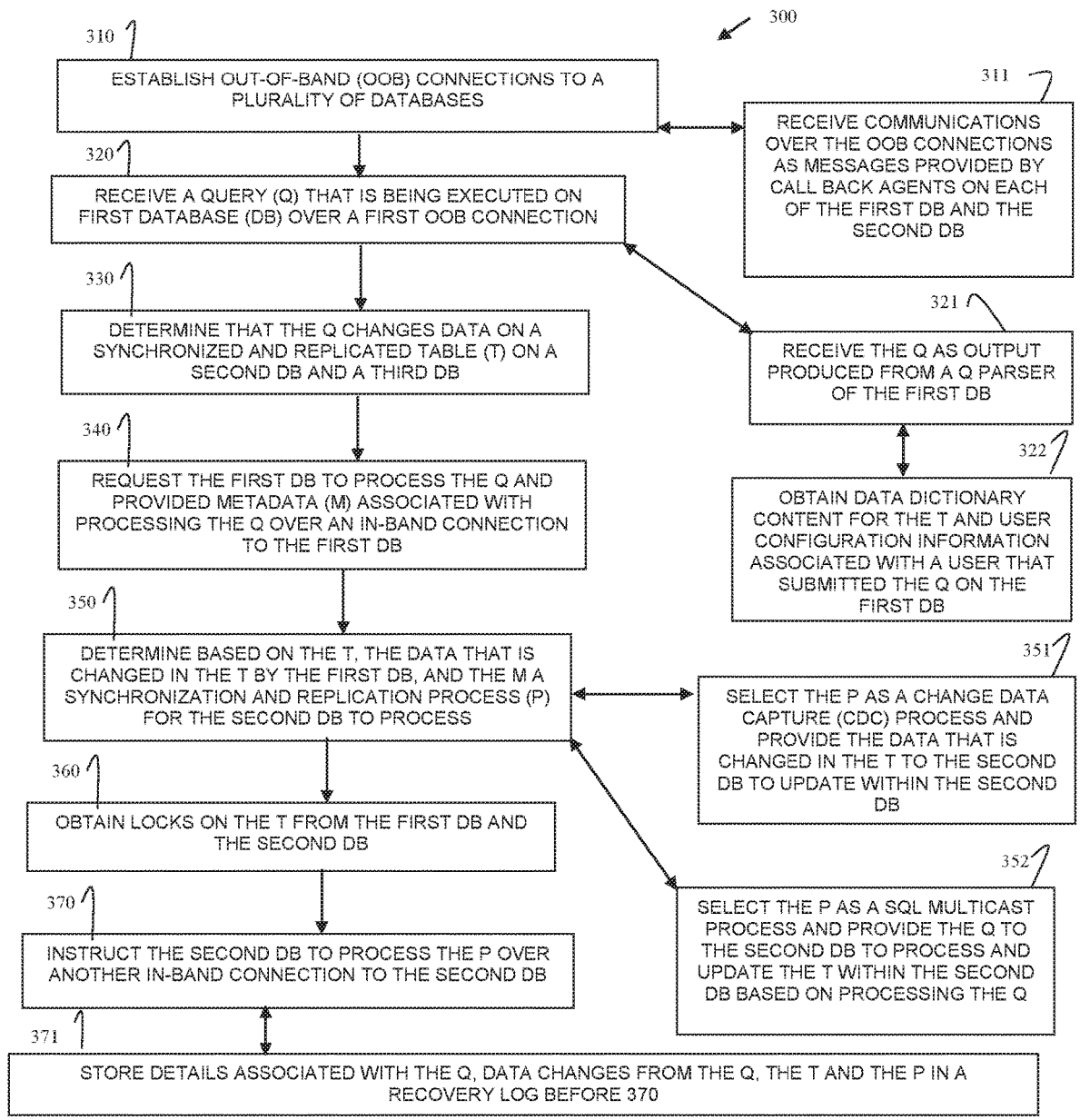
FIG. 3 is a diagram of another method for optimal multi-environment data synchronization/replication, according to an example embodiment.

FIG. 3 is a diagram of another method 300 for optimal multi-environment data synchronization/replication, according to an embodiment. The method 300 is implemented as one or more software modules referred to as a "multi-environment-synchronization-and-replication manager." The multi-environment-synchronization-and-replication manager represents executable instructions that are programmed within memory or a non-transitory computer-readable medium and executed by one or more hardware processors of a device. The multi-environment-synchronization-and-replication manager may have access to one or more network connections during processing, which can be wired, wireless, or a combination of wired and wireless.

The processing depicted for the multi-environment-synchronization-and-replication manager in the FIG. 3 presents another and, in some ways, enhanced perspective of the processing discussed above with the FIGS. 1 and 2.

In an embodiment, the multi-environment-synchronization-and-replication manager is all of or any combination of: the manager 131, the synchronizer/sequencer 132, and/or the method 200.

At 310, the mufti-environment-synchronization-and-replication manager establishes OOB connections to a plurality of database that have resources (tables), which are being synchronized and replicated. It is noted that not all resources from each different database environment need to be synchronized or be replicated in each database.

In an embodiment, at 311, the multi-environment-synchronization-and-replication manager receives communications over the OOB connections as messages provided by call back agents on each of a first database and second database.

At 320, the multi-environment-synchronization-and-replication manager receives a query that is being executed on a first database over a first OOB connection. That is, the first database through a callback agent requests permission of the multi-environment-synchronization-and-replication manager to execute the query on the first database over the first OOB connection.

In an embodiment, at 321, the multi-environment-synchronization-and-replication manager receives the query in the level of detail that is produced as output from a query parser associated with the first database.

In an embodiment of 321 and at 322, the multi-environment-synchronization-and-replication manager obtains data dictionary content for the table or tables associated with the query and obtains user configuration information associated with a user that submitted the query on the first database.

At 330, the multi-environment-synchronization-and-replication manager determines that the query changes data on a synchronized and replicated table (table) on at least one second database of a multi-database environment.

At 340, the multi-environment-synchronization-and-replication manager requests the first database to process the query and provided metadata associated with processing the query over an in-band connection to the second database.

At 350, the mufti-environment-synchronization-and-replication manager determines based on the table, the data that is changed by the first database, and the metadata a synchronization and replication process (process) for the second database to process. Again, selection/determination is based on a variety of factors as discussed above.

In an embodiment, at 351, the multi-environment-synchronization-and-replication manager selects the process as a Change Data Capture or CDM, and the multi-environment-synchronization-and-replication manager provides the data that is changed in the table to the second database to update within the second database.

In an embodiment, at 352, the multi-environment-synchronization-and-replication manager selects the process as an SQL multicast process, and the multi-environment-synchronization-and-replication manager provides the query to the second database to process and update within the second database based on processing the query.

At 360, the multi-environment-synchronization-and-replication manager obtains locks on the table from the first database and the second database.

At 370, the multi-environment-synchronization-and-replication manager instructs the second database to process the selected synchronization and replication process over another in-band connection between the synchronization-and-replication manager and the second database.

In an embodiment, at 371, the multi-environment-synchronization-and-replication manager stores details associated with the query, data changes from the query, the table, and the selected synchronization and replication process in a recover log before instructing the third database at 370.

Figure 4:
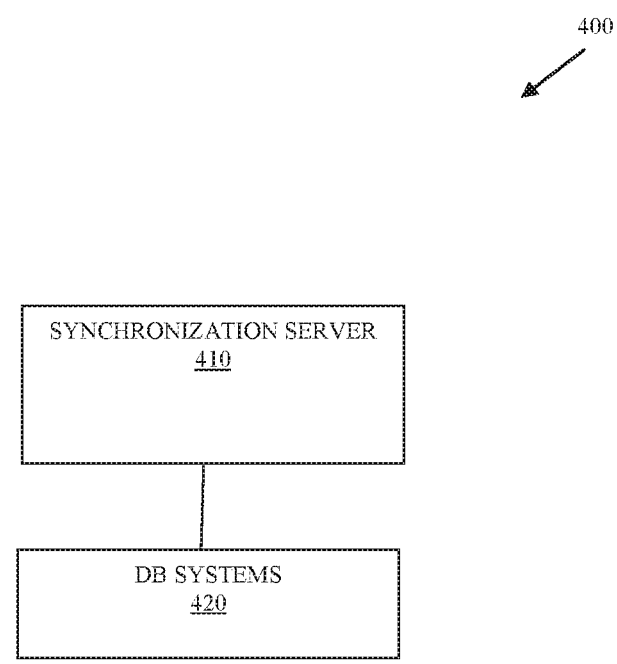
FIG. 4 is a diagram of a system for optimal multi-environment data synchronization/replication, according to an example embodiment.

FIG. 4 is a diagram of a system 400 for optimal multi-environment data synchronization/replication, according to an example embodiment. The system 400 includes a variety of hardware components and software components. The software components are programmed as executable instructions into memory and/or a non-transitory computer-readable medium for execution on the hardware components (hardware processors). The system 400 includes one or more network connections; the networks can be wired, wireless, or a combination of wired and wireless.

The system 400 implements, inter alia, the processing discussed above with the FIGS. 1-3.

The system 400 includes: a synchronization server 410 and a plurality of database systems 420.

In an embodiment, the synchronization server 410 is the server 130.

In an embodiment, the database systems 420 are the data systems 110, 140, and 150.

In an embodiment, the synchronization server 410 performs the processing discussed above with the FIGS. 1-3.

The synchronization server 410 includes a processor and non-transitory computer-readable storage media having executable instructions. The executable instructions when executed by the processor from the non-transitory computer-readable storage media cause the processor to: 1) establish OOB connections with each of the database systems 420 using message passing; 2) identify queries executed on an originating database 420 system over a first OOB connection of the OOB connections and determine when a given query that is processed on the originating database system 420 requires changes to replicated source objects in remaining ones of the database systems 420; 3) execute the given query on a selected database system 420 from the remaining ones of the database systems 420; 4) use metadata returned from the selected database system 420 to select a synchronization and replication process; and 5) instruct the remaining ones of the database systems 420, excluding the selected database system 420, to process the synchronization and replication process to update the changes associated the replicated source objects.

In an embodiment, the executable instructions on server 420 when executed by the processor from the non-transitory computer-readable storage media further cause the processor to: perform synchronization and replication when the originating database system 420 lacks a pre-established connection to the synchronization server 410 when the query was submitted on the originating database system 420 by using messages received from the originating database system 420 over the first OOB connection.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
receiving a data-changing request from a first data system;
identifying a source data system based on the data-changing request;
providing the data-changing request to the source data system for processing over an in-band connection to the source data system;
obtaining status information for the providing from the source data system over a source-data-system out-of-band connection with the source data system;
selecting a synchronization process from multiple synchronization processes based on the data-changing request and the status information; and
instructing target data systems to process the synchronization process over target-data-system in-band connections to ensure data changes made to data source objects by the source data system when processing the data-changing request are synchronized and replicated on the target data systems using the synchronization process.

2. The method of claim 1, wherein receiving further includes receiving the data-changing request over the in-band connection from the source data system.

3. The method of claim 1, wherein receiving further includes receiving the data-changing request over an out-of-band data connection from a call back agent on the first data system.

4. The method of claim 3, wherein receiving further includes obtaining the data-changing request as output produced from a data request parser of the first data system.

5. The method of claim 4, wherein obtaining further includes determining from the output that at least of the data source objects requires synchronization and replication with the target data systems.

6. The method of claim 5, wherein providing further includes requesting the status information from the source data system as metadata defining a session context required by the source data system when processing the data-changing request and data source object locking details.

7. The method of claim 6, wherein obtaining the status information further includes determining from a state of the data source objects and the metadata that the target data systems require synchronization and replication.

8. The method of claim 7, wherein selecting further includes using the metadata to obtain locks on the data source objects with each of the target data systems.

9. The method of claim 8, wherein instructing further includes ensuring all locks are obtained for the data source objects before the instructing of each of the target data systems to process the synchronization process.

10. The method of claim 1, wherein instructing further includes instructing the target data systems to perform the data changes on the data source objects as a copy of changes resulting from the providing when the synchronization process is a Change Data Capture (CDC) process selected in the selecting.

11. The method of claim 1, wherein instructing further includes instructing the target data systems to process the data changes on the data source objects by processing the data-changing request on each of the target data systems when the synchronization process is a Structured Query Language (SQL) multicast process selected in the selecting.

12. The method of claim 1, wherein instructing further includes validated statuses returned from each target data system and ensuring that each status matches the status information from the obtaining.

13. A method comprising:
establishing out-of-band (OOB) connections to a plurality of databases;
receiving a query that is being executed on a first data database over a first OOB connection;
determining that the query changes data on a synchronized and replicated table appearing on a second database;
requesting the first database to process the query and provide metadata associated with processing the query over a first-database in-band connection to the first database:
determining based on the synchronized and replicated table, the data that is changed in the synchronized and replicated table by the first database, and the metadata a synchronization and replication process for the second database to process;
obtaining locks on the synchronized and replicated table from the first database and the second database;
instructing the second database to process the synchronization and replication process over a second-database in-band connection to the second database.

14. The method of claim 13, wherein establishing further includes receiving communications over the OOB connections as messages provided by call back agents on each of the first database and the second database.

15. The method of claim 13, wherein receiving further includes receiving the query as output produced from a query parser of the first database.

16. The method of claim 15, wherein receiving further includes obtaining data dictionary content for the synchronized and replicated table and user configuration information associated with a user that submitted the query on the first database.

17. The method of claim 13, wherein determining further includes selecting the synchronization and replication process as a change data capture process and providing the data that is changed in the synchronized and replicated table to the second database to updated within the second database.

18. The method of claim 13, wherein determining further includes selecting the synchronization and replication process as a Structured Query Language (SQL) multicast process and providing the query to the second database to process and update the synchronized and replicated table within the second database based on processing the query.

19. The method of claim 13, wherein instructing further includes storing details associated with query, the synchronization and replication table, changes made from the query, and the synchronization and replication process in a recovery log before instructing the second database to process the synchronization and replication process.

20. A system, comprising:
a synchronization server; and
a plurality of database systems;
wherein the synchronization server is configured to:
establish out-of-band (OOB) connections with each of the database systems using message passing;
identify queries executed on an originating database system over a first OOB connection of the OOB connections and determine when a given query that is processed on the originating database system requires changes to replicated source objects in remaining ones of the database systems;
execute the given query on a selected database system from the remaining ones of the database systems;
use metadata returned from the selected database system to select a synchronization and replication process;
instruct the remaining ones of the database systems, excluding the selected database system, to process the synchronization and replication process to update the changes associated the replicated source objects.

21. The system of claim 20, wherein the synchronization server is further configured to perform synchronization and replication when the originating database system lacks a pre-established connection to the synchronization server when the query was submitted on the originating database system by using messages received from the originating database system over the first OOB connection.

* * * * *